(12) United States Patent  (10) Patent No.: US 9,152,892 B2
Fay et al.                (45) Date of Patent:     Oct. 6, 2015

(54) GLOBAL PRINTING SYSTEM AND METHOD FOR RENDERING ENCODING SCHEME INDEPENDENT LABELS HAVING SERIALIZATION DATA

(71) Applicant: ZIH Corp., Lincolnshire, IL (US)

(72) Inventors: John Fay, Cary, IL (US); Jessica Wettstein, Hainesville, IL (US); Cabel Sholdt, Vernon Hills, IL (US); Fred Susi, McHenry, IL (US)

(73) Assignee: ZIH Corp., Lincolnshire, IL (US)

( * ) Notice: Subject to any disclaimer, the term of this patent is extended or adjusted under 35 U.S.C. 154(b) by 0 days.

(21) Appl. No.: 14/010,156

(22) Filed: Aug. 26, 2013

(65) Prior Publication Data

US 2013/0342862 A1    Dec. 26, 2013

Related U.S. Application Data

(60) Continuation of application No. 13/477,653, filed on May 22, 2012, now abandoned, which is a continuation of application No. 13/099,882, filed on May 3, 2011, now Pat. No. 8,218,156, which is a
(Continued)

(51) Int. Cl.
*G06F 3/12* (2006.01)
*G06K 15/02* (2006.01)
(Continued)

(52) U.S. Cl.
CPC .......... *G06K 15/1802* (2013.01); *G06F 3/1293* (2013.01); *G06F 17/2217* (2013.01); *G06F 17/2705* (2013.01)

(58) Field of Classification Search
CPC ............ G06F 17/2217; G06F 17/2223; G06F 17/2705; G06K 1/121; G06K 15/02

USPC .......................................... 358/1.11, 1.13, 1.9
See application file for complete search history.

(56) References Cited

U.S. PATENT DOCUMENTS 5,293,466 A   3/1994  Bringmann
5,784,544 A   7/1998  Stevens
(Continued)

FOREIGN PATENT DOCUMENTS

EP         0 469 974 A2    2/1992

OTHER PUBLICATIONS

"ZPL II—Programming Guide—Volume One", Jul. 29, 2005, http://www.zebra.com/id/zebra/na/en/documentlibrary/manuals/en/zpl_ii_programming2.File.tmp/45541L-002_RA.pdf, retrieved Aug. 1, 2014.*
(Continued)

*Primary Examiner* — Fred Guillermety
(74) *Attorney, Agent, or Firm* — Alston & Bird LLP (57) ABSTRACT

A system and method for parsing data formatted in a plurality of encoding schemes at a printer is provided. The method comprises receiving serialization data from at least one host computer at a printer where at least a portion of the serialization data is encoded in at least one encoding scheme. The method also includes converting the data into a first encoding scheme. The method also includes parsing the converted data into an array of combining semantic clusters based on a plurality of rules, each combining semantic cluster comprising a plurality of code points. The method also includes generating a plurality of labels for printing based on the array of combining semantic clusters where each of the plurality of labels are printed such that one or more elements within the array are at least one of incremented or decremented.

28 Claims, 8 Drawing Sheets

Related U.S. Application Data division of application No. 11/626,670, filed on Jan. 24, 2007, now Pat. No. 7,973,946.

(60) Provisional application No. 60/761,610, filed on Jan. 24, 2006.

(51) Int. Cl.
 *G06F 17/22* (2006.01)
 *G06F 17/27* (2006.01)

(56) References Cited

U.S. PATENT DOCUMENTS

| | | | |
|---|---|---|---|
| 5,964,885 | A | 10/1999 | Little et al. |
| 5,999,706 | A | 12/1999 | Chrosny |
| 6,024,289 | A | 2/2000 | Ackley |
| 6,186,406 | B1 | 2/2001 | Ackley |
| 6,445,458 | B1 | 9/2002 | Focazio et al. |
| 6,539,118 | B1 | 3/2003 | Murray et al. |
| 6,540,142 | B1 | 4/2003 | Alleshouse |
| 6,583,789 | B1 | 6/2003 | Carlson et al. |
| 7,973,946 | B2 | 7/2011 | Fay et al. |
| 8,218,156 | B2 | 7/2012 | Fay et al. |
| 2002/0101610 | A1* | 8/2002 | Winne ......................... 358/1.15 |
| 2002/0120647 | A1 | 8/2002 | Amano |
| 2003/0119551 | A1 | 6/2003 | Laukkanen et al. |
| 2004/0094632 | A1 | 5/2004 | Alleshouse |
| 2004/0215647 | A1 | 10/2004 | Farn et al. |
| 2004/0257591 | A1 | 12/2004 | Engelman et al. |
| 2006/0265649 | A1 | 11/2006 | Danilo |
| 2009/0222353 | A1 | 9/2009 | Guest et al. |
| 2011/0255108 | A1 | 10/2011 | Fay et al. |

OTHER PUBLICATIONS

The partial International Search Report for International Appl. No. PCT/US2007/002026, mailed Dec. 18, 2007, received Jan. 7, 2008.

"Zebra's Solution for Printing International Characters from mySAP™ Business Suite (Unicode™ UTF-8)," Zebra Black&White Paper, Mar. 1, 2005, <http://www.zebra.com/id/zebra/na/en/documentlibrary/whitepapers/printing_international_characters.File.tmp/WP13844_SAP_Unicode_new.pdf>, retrieved Dec. 6, 2007.

The International Search Report and Written Opinion for International Appl. No. PCT/US2007/002026, mailed Mar. 7, 2008, received Mar. 13, 2008.

* cited by examiner

| | |
|---|---|
| ASSAY (BY DENSITY) MIN | 99.5 VOL% |
| DENSITY 120C | ~.791C/ML |
| WATER CONTENT MAX. | 0.4 % |
| NONVOLATILE MATTER MAX. | 0.003% |
| ACID(AS $CH_2COOH$) MAX. | 0.002% |
| BASE(AS $NH_3$) MAX. | 1 PPM |
| HEAVY METAL(AS Pb) MAX. | 2 PPM |
| ALDEHYDE AND KETANE (AS $CH_2COCH_2$) MAX. | 0.001% |
| FUSEL OIL(AS $C_5H_{12}O$) MAX. | 0.004% |
| METHANOL($CH_3OH$) MAX. | 0.02 % |
| BENZEN AND OTHER ORGANIC IMPURITIES | TEST |
| SUBSTANCES REDUCING PERMANGANATE 10 | PASS |
| SUBSTANCES DARKENED BY $H_2SO_4$ 10 | TEST |
| | PASS |

050-00485

試　薬

ETHANOL (99.5)

エタノール(99.5)

$C_2H_5OH$ *FW:46.07*

試薬一般　　取扱い注意事項

500 ml
(395g)

・取扱い注意事項
・取扱い注意事項
・取扱い注意事項

引門用田方西大口の大上78℃
貝身元
門門用田方西大口の大上570

危険物第四種
アルコール類
危険等級　Ⅱ

火気厳禁

東京テシック工業株式会社

Lot No.　JIK08618

```
^FO100^A1^FDCongratulations^FS
^FO100,100^A1^FDגוב בקע^FS
```

גוב בקע Congratulations

THIS TEXT HAS BEEN WORD
WRAPPED INSIDE A TEXT
BOX. THERE IS TOO MUCH
TEXT TO FIT INSIDE THE TEXT
BOX. THIS IS AN EXAM###

FIG. 8 testd.txt-Notepad
File Edit Format Help

```
^XA^Fo100,100
^A0,25,25
^FD12A^SFnnA,C
^PQ4
^XZ
```

FIG. 9 moon.txt-Notepad
File Edit Format Help

```
^XA
^CI14^SEB:UNICODE.DAT
^CW1,B:ANMDJ.TTF
^FO100,100^A1N,50,50^FD日月A^SF%%A,C
^PQ4
^XZ
```

| ब | ि | ल | ् | ल | ी |
|---|---|---|---|---|---|
| 092C | 093F | 0932 | 094D | 0932 | 0940 |

GLOBAL PRINTING SYSTEM AND METHOD FOR RENDERING ENCODING SCHEME INDEPENDENT LABELS HAVING SERIALIZATION DATA

CROSS-REFERENCE TO RELATED APPLICATION

This application is a continuation of and claims priority to co-pending U.S. patent application Ser. No. 13/477,653, filed May 22, 2012, which is a continuation of and claims priority to U.S. patent application Ser. No. 13/099,882, filed May 3, 2011, now U.S. Pat. No. 8,218,156, which is a divisional of and claims priority to U.S. patent application Ser. No. 11/626,670, filed Jan. 24, 2007, now U.S. Pat. No. 7,973,946, which claims priority from U.S. Provisional Patent Application No. 60/761,610 filed Jan. 24, 2006, the contents of all the proceeding are incorporated herein in their entireties by reference.

BACKGROUND OF THE INVENTION

1. Field of the Invention

The present invention is related to a global printing system, and more particularly, to a printer that is capable of analyzing serialization data and rendering a plurality of labels or barcodes based in an encoding scheme independent manner.

2. Description of Related Art

Printers are used in countries around the world. Most of these countries require printing in languages other than English. For example, Europe, the Middle East, India & Southeast Asia, and China, Japan, Korea, and Vietnam (commonly known as "CJKV") utilize printers that produce labels in their native language or in several languages on a single label. Thus, customers utilize thermal printers for the labels the printer produces, not the actual printer. These labels are made up of human readable text, graphics, and barcodes.

Languages have different ways of displaying the human readable text, each using different scripts. English, for example, uses the Latin script to produce human readable English text. A single script can be used for more than one language, as is the case with the Hanzi script being used to make human readable text for both Mandarin and Cantonese. A single language can also use more than one script. For instance, Japanese uses the Hiragana, Katakana, and Kanji scripts for written Japanese.

In order to print text, graphics, and barcodes, the data to be printed is encoded. Code points are utilized to represent characters, where characters are symbols that represent the smallest component of written language, such as letters and numbers. Glyphs are used to graphically represent the shapes of characters when they are displayed or rendered, while a font is a collection of glyphs. Each character does not necessarily correspond to a specific glyph, as there is not a one-to-one relationship between the two. The encoding is employed to convert code points into byte representation in storage memory. For example, some legacy encoding schemes include: ASCII in the United States; CP 850 in Latin-speaking regions; Shift-JIS in Japan; UHangul, Johab, and Wansung in Korea; and Big 5, GB 2312, and HZ in China/Taiwan.

However, because encoding schemes were insufficient to cover all languages, and many encodings schemes conflicted with one another, Unicode was developed. Unicode achieves uniformity between all languages and provides a set of coded characters that includes almost all characters used worldwide in an attempt to provide a universal standard. The Unicode Standard provides a number value (i.e., code point) and a name for each character, as well as various information such as mapping tables, character property tables, and mappings to character sets, to ensure legible and consistent implementation of data.

Unicode may be represented in UTF-8, UTF-16, and UTF-32 (UTF=Unicode Transformation) encodings but may also be represented by UCS-2 (UCS=Universal Character Set) and UCS-4. Each of the three UTF encoding schemes is capable of representing the full range of Unicode characters and have respective advantages and disadvantages. UTF-32 is the simplest form where each code point is represented by a single 32-bit code unit (i.e., a fixed width character encoding form). UTF-8 is a variable width encoding form that preserves ASCII transparency and uses 8-bit encoding units. UCS-2 is a two byte fixed width encoding scheme that does therefore not include support for "surrogate characters," which are characters that require more than two bytes to represent.

With respect to UTF-16, code points within a specified range are represented by a single 16-bit unit, while code points in a supplementary plane are represented by pairs of 16-bit units. UTF-16 is not an ASCII transparent encoding scheme. While it does map the characters included in the ASCII character set to the same code points as ASCII, the way it encodes these code points is different. UTF-16 encodes these code points using two bytes. The Most Significant Byte (MSB) is 0x00 while the Least Significant Byte (LSB) is the same as the ASCII value. Often, Unicode scripts will contain a Byte Order Mark (BOM) to denote what the endianness of the file is. However, the Unicode standard does not require that the file contain a BOM. Furthermore, the Unicode standard states that if a system detects Unicode data that is encoded using the UTF-16 encoding scheme and a BOM is not present, endianness is assumed to be big.

Current printers support a variety of ASCII transparent encoding schemes, including both single and multi-byte encodings, but encode the ASCII set of characters using one byte. This makes it possible for printers to simply look at printer control commands as if they were ASCII, which enables a printer control command to be embedded that specifies what the encoding scheme actually is prior to reaching the field data which could include multi-byte characters. However, when utilizing a Unicode encoding scheme, the printer is prevented from blindly looking for printer control commands because not all of the data is ASCII transparent.

Unicode presents other issues with respect to grapheme clusters. In English, the concept of "a character" is very simple; it is a letter which is represented by a single code point. However, in other languages, defining "a character" is a more complex task, as a character is often made up of multiple code points. For example the "a" Small Latin Letter A with Grave can be encoded as both U+00E0 and as the combined U+0061 [Small Latin Letter A] U+0300 [Combining Grave Accent]. The Unicode Standard attempts to define what makes up "a character" through the creation of a grapheme cluster; however, this only handles the issue when the combining marks are of a non-spacing type. If printers use grapheme clusters to determine how to break apart a data string for vertical printing, a glyph could appear by itself on a line, which would render the text virtually unreadable.

Because Unicode provides characters rather than the actual rendering of the characters (i.e., formatting, text placement, glyph selection, glyph style, or glyph size), software is required to properly implement Unicode at a printer. For many languages and countries, a label design application must be used to format labels to be printed. The label design applications download the format to the printer as a graphic, greatly increasing the first label out time. A slow first label out is also caused by the slow memory used to store the large fonts required to support some scripts, such as Japanese or Simplified Chinese. The memory required means an expensive upgrade but is necessary since some fonts, such as Andale, can be as large as 22 MB and do not fit onto the printer's available memory. For some languages and encodings, there is improper support or they are not available at all. Additionally, Unicode is not supported in all font technologies, such as TrueType, because the number of defined Unicode points exceeds the capacity of current font technologies.

There are four main regions with languages issues to consider: Europe, the Middle East, India and Southeast Asia, and CJKV. Moreover, many companies are "multinational" and operate in many of the other regions and have both similar and separate language issues from those regions. Multinationals may be located in foreign markets, sell product into foreign markets, and/or manufacture in foreign markets.

In the Middle East, Hebrew and Arabic are the two most common languages. Hebrew is the official language of Israel. Arabic is the official language of Egypt, UAE, Iraq, Kuwait, and many other Middle East countries. The Arabic alphabet is also used to write non-Arabic languages. The Malay language, an official language of Singapore, Malaysia, and Brunei, uses the Arabic characters. Other languages that use the Arabic characters are Persian (Iran, Afghanistan, and Uzbekistan) and Urdu (Pakistan). Hebrew and Arabic differ from most other languages because they are read and written from right to left. Another issue with Arabic is that characters are displayed cursively. While English has an optional cursive style of writing, Arabic is always written cursively. The Arabic characters change shape depending on the characters around them, which is known as contextual shaping. Twenty two of the 28 characters have up to 4 different glyphs depending on if the character is at the beginning, middle, or end of a word. There is also a form for when the character is isolated. A single Unicode code point is given to each character, even though the code point can have several forms. The remaining 6 characters do not change shape. An interesting issue with writing right to left is that numerals are still written from left to right, which is a common occurrence in part numbers or addresses. This is the reason for the name bi-directional text, since the text can switch from left to right and right to left in the same sentence.

The India and Southeast Asia region consists of countries such as Thailand, India, Sri Lanka, Philippines, and Bangladesh. These countries use scripts such as Thai, Devanagari, Telugu, Bengali, and Sinhala. These scripts are less complex than the Middle East languages because they are written from left to right. The issue with Indic and Southeast Asian languages is that they have combining characters, and languages that use the Devanagari and similar scripts have connecting headstrokes. A headstroke is a horizontal line that runs across the top of each character. The character stems off from the headstroke. The characters combine and can change order depending on the characters around them, mostly with dependent vowels. Similar to Arabic, even though a character can have several forms, it is only assigned one Unicode code point.

The remaining Asian languages not covered by the other regions are Japanese, Korean, Simplified Chinese, Traditional Chinese, and Vietnamese, commonly known as CJKV. These languages are used in China, Taiwan, Hong Kong, Singapore, Vietnam, Korea, and Japan. The main issue with these languages is the vast amount of characters used to write each of these languages. Although only around 2000-3000 characters are required for basic literacy in Japanese or Chinese, there are upwards of 80000 characters listed in some dictionaries. Most of these characters are rarely used in everyday writings, but are commonly used in proper names. In most of these languages, a character will have the same meaning in all the languages, but may have a slightly different glyph. Another issue with CJKV languages is multiple scripts being used. For example, a Japanese sentence can use up to four different scripts. Vietnamese also presents another problem with writing using Latin characters. Vietnamese words must have a tone mark, which is a diacritical mark combined with a base character. Many of these characters do not have a presentation form and must be rendered with a font engine. Vietnamese also presents a problem in that it requires more vertical space to be displayed properly. When you stack these components the vertical space increases.

Conventional printers provide the ability to print horizontal blocks of text and simple single vertical columns of text. While this is sufficient for many languages of the world, it is not sufficient for the Japanese language. This language can be written either horizontally or vertically. Also, when a combination of Japanese and Latin text is combined in the same block, there are a variety of possibilities of how this would appear, as shown below.

|  |  |  |
|---|---|---|
| イ | イ | イ |
| 199 | 199 | 1 |
| ウ | ウ | 9 |
|  |  | 9 |
|  |  | ウ |

To make the situation more complex, there are no rules that define which of these options is the correct one. In fact, all three of these are correct and the one that is used is left up to the discretion of the typographer.

Multinational often means multilingual. Different from the other mentioned regions where similar languages are required, multinationals must deal with printing labels with multiple languages and all of the language issues associated with each individual language. For example, a label may contain Arabic text written from right to left and French that is written left to right. This label would include other language issues like combining diacritic marks for the French and contextual shaping for the Arabic.

Furthermore, most barcode standards do not specify a particular encoding for the data contained in them but rather a character that would be represented by a particular bar sequence. The QR barcode is an exception to this statement. This QR barcode is capable of encoding data in Shift-JIS but does not always encode data as Shift-JIS. The barcode could also encode numeric data, alphanumeric data, or 8-bit JIS data. The customer could send Unicode encoded data and request that the data be written onto a QR barcode. Therefore, current printers are incapable of supporting barcodes that are encoding scheme independent in order to create a valid barcode with data that reflects the intentions of the customer.

Many companies currently offer locale specific solutions, such as a specific font, but there is no truly global solution provided by any thermal printer manufacturer "out-of-the-box." Currently, the thermal printer market offers locale specific fonts as options, but printers are limited by standard printer memory and expensive memory upgrades to the number of fonts and languages the printer can support at any one time. Furthermore, many customers are unwilling to change to Unicode and will continue to use their legacy encoding schemes because of the high cost to convert. Those customers that do wish to convert to Unicode also face difficulties, such as how to properly parse printer control commands that are being sent simultaneously (e.g., in both ASCII transparent encoding schemes and in UTF-16 encoding schemes) without requiring an encoding indicator before the printer control commands are sent to the printer. In addition, customers wishing to send scripts supported by legacy encoding schemes may or may not have an encoding scheme command that is capable of being processed as they have been in the past.

It would therefore be advantageous to provide a global printing system that is capable of printing in the native language of various countries regardless of the encoding scheme employed. In addition, it would be advantageous to provide a global printing system that is cost effective and efficient, as well as capable of printing multiple scripts and/or multiple fonts on a label. Moreover, it would be advantageous to provide a global printing system that is capable of properly rendering Unicode characters and/or non-Unicode characters on a label.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Figure 1:
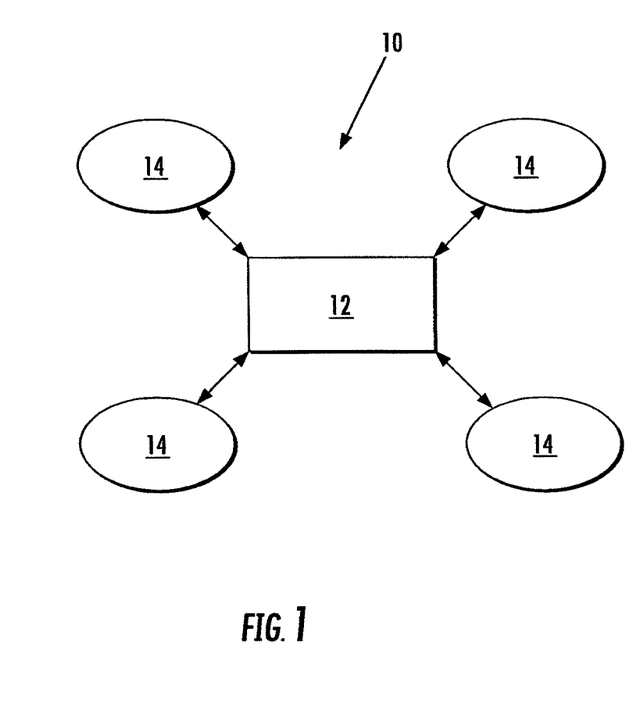
FIG. 1 is a diagram depicting a printer in communication with a plurality of host computers according to one embodiment of the present invention.
Figure 2:
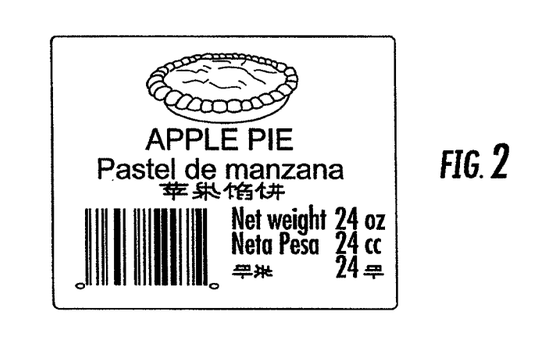
FIG. 2 is an exemplary product label depicting multiple scripts according to one embodiment of the present invention.
Figure 3:
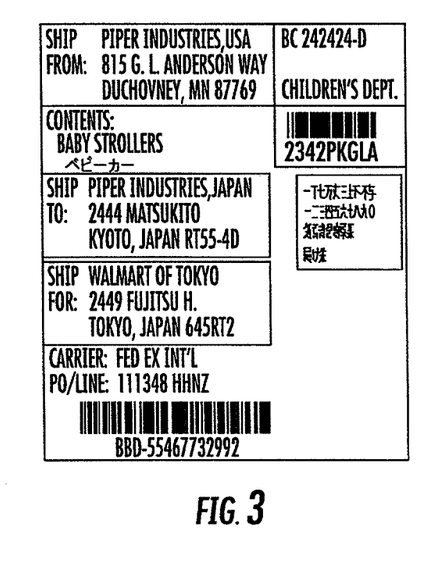
FIG. 3 is an exemplary shipping label depicting multiple scripts according to an additional embodiment of the present invention.

Referring to the drawings and, in particular, FIG. 1, the present invention provides a global printing system 10 that includes a printer 12 that is capable of communicating with a plurality of host computers 14. Each of the host computers 14 transmits commands to the printer 12 that may be formatted in different encoding schemes. The printer 12 is capable of determining the encoding scheme for the commands from each host computer 14 such that the commands may be interpreted correctly. Thus, the printer 12 is capable of printing various language scripts regardless of the encoding scheme and/or language script used. Moreover, the printer 12 is capable of printing multiple scripts on a single label (see FIGS. 2 and 3), as well as in multiple fonts (see FIG. 4). The printer 12 is capable of effectively printing the scripts on labels regardless of the orientation of the text and/or the complexity of serialized data. Additionally, the printer 12 is capable of encoding barcode labels such that the data input by the user matches the data that a scanner scanning the barcode sends back to the computer regardless of the encoding scheme employed.

The printer language referred to herein is Zebra Printer Language ("ZPL") that is compatible with printers manufactured by ZIH Corp., the present assignee. For example, exemplary commands referred to herein include: ^CI (change international font); ^DT (download TrueType font); ^DY (download graphics); ^FB (field block); ^FD (field data); ^FO (field origin); ^FP (field parameter); ^FV (field variable); ^SF (serialization field with a standard ^FD string); ^SL (set mode and language for real-time clock); ^SN (serialization data); and ^XZ (end format). Thus, ZPL is known to those of ordinary skill in the art as a programming language for generating commands for the printer 12. However, it is understood that the programming language is adaptable to other printers such that any equivalent programming language may be written to carry out the functions set forth herein with any suitable printer.

Moreover, the printer 12 is typically employed to render data received from one or more host computers 14 and print the rendered data on labels, such as barcode labels. However, the term "label" is not meant to be limiting, as the printer 12 may be configured to print on any suitable medium capable of rendering one or more glyphs thereon. For instance, the label could be paper, cloth, plastic, metal, or other medium capable of having human-readable text, graphics, or barcodes depicted thereon.

The printer 12 is typically a thermal printer for printing labels. However, the printer 12 could be any suitable printer capable of rendering data on a label. For instance, the printer 12 could be a computer peripheral device that produces a hard copy (permanent human-readable text and/or graphics, usually on paper) from data stored in a computer connected to it.

The printer 12 is capable of supporting Unicode. If employing Unicode, the printer 12 is required to comply with at least portions of the Unicode Standard, namely, Chapter 3 of the Unicode Standard that sets forth the details for conformance. For example, if the printer 12 claims to support the Arabic or Hebrew scripts, then the system must support the bi-directional text layout algorithm. Another example is if the printer 12 does not support certain character blocks, such as the pre-composed Hangul characters, documentation that those characters are not supported is required. It is understood that the printer 12 may be alternatively configured to support subsets of Unicode by excluding particular scripts that may not be relevant to a printing application, such as Mongolian, Ethiopic, Cherokee, Canadian Aboriginal, Byzantine Music Symbols, Braille, and Historic scripts.

The printer 12 supports contextual mapping, which is prevalent with Arabic letters. The printer 12 may employ various solutions, such as glyph substitution tables ("GSUB") or an algorithm derived from the Arabicshaping.txt file in the Unicode Character Database, to provide such support. Furthermore, the printer 12 supports diacritic marks. One way to support diacritic marks is to have a font engine render the character and combining mark together. For instance, a font engine could combine the character and the non-spacing diacritic mark and then render the combined character. Another way to support diacritic marks is through the use of presentation forms. The character and the combining mark are converted into its presentation form. The presentation form is a pre-combined character that exists in its own code point in Unicode. Normalization C Algorithm aids the conversion to the presentation form and is detailed in the Unicode Standard. A font engine then renders the pre-combined presentation form, instead of the separate character and combining mark. If the presentation form is not available, the un-combined characters are printed side-by-side. A font engine may be used to combine characters when a presentation form is not available. Thus, the printer 12 is configured to accept the combining characters in the presentation forms and the characters plus combining marks.

Additionally, the printer 12 is capable of supporting bi-directional text if Arabic or Hebrew languages are supported, which is in accordance with the Unicode Standard. The printer 12 can also support text written left-to-right on the same line as text written right-to-left (e.g., English and Hebrew). Bi-directional support is typically selectable. Thus, with the bi-directional support having user selectable support, the printer 12 will remain backwards compatible. The user should be able to select bi-directional text support through both a ZPL command and a front panel prompt on the printer 12.

Figure 5:
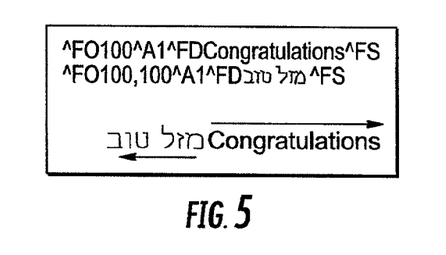
FIG. 5 is an exemplary ^FO command according to another embodiment of the present invention.

Currently, the ^FO command sets the upper-left corner of the field area. When working with left to right oriented text in the ^FD command, the field origin is the beginning of the text; however, when the ^FD command contains right to left oriented text, the ^FO command will set the upper-right corner of the field area. FIG. 5 demonstrates an exemplary ^FO command with right to left and left to right oriented text. Both of the ^FD commands have the same ^FO command setting the field origin at the same location for both ^FD commands. Since the first ^FD command contains English, which is left to right oriented text, the field origin is the upper-left corner of the field area. The second command contains Hebrew text, which is right to left oriented text, so the field origin is set at the upper-right corner of the field area.

Furthermore, the printer 12 has the ability to override the location of field origin using explicit commands rather than the printer 12 using the script to determine the location based on the primary directionality of the script. Primary directionality of the script is defined within the Unicode Standard.

Figure 6:
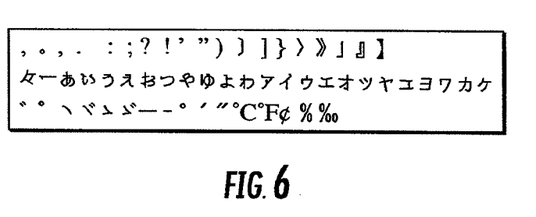
FIG. 6 is an exemplary list of characters prohibited from beginning a line of text.
Figures 7, 9:
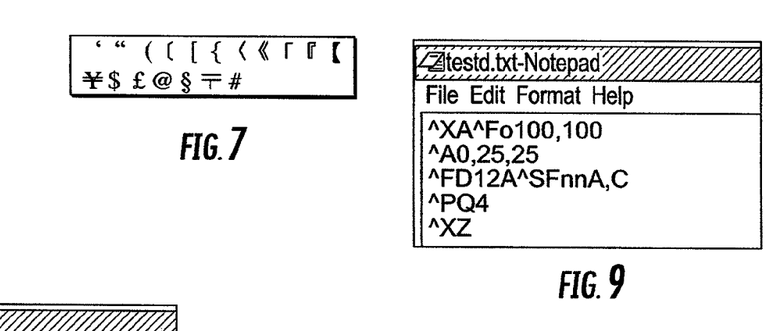
FIG. 7 is an exemplary list of characters prohibited from ending a line of text.
FIG. 9 is an exemplary command having ASCII characters in the data field according to one embodiment of the present invention.

The printer 12 also supports word wrapping. When employing word wrapping, normative line breaking properties are followed. The most general way of word wrapping is to line break at spaces; however, in some languages, there are no spaces. If there are no spaces in the text, as in Japanese or Chinese, then the text should be broken when there is no more room in a line. There are certain characters that are prohibited from beginning a line of text, such as those shown in FIG. 6. These characters should be "wrapped up" to stay with the previous line. Similarly, there are also certain characters that should not end a line of text and should begin a new line of text, such as those shown in FIG. 7. These characters should be "wrapped down" to start the next line. Bi-directional text also presents issues with respect to line breaking. For example, since Hebrew is written from right to left, the Hebrew text that should be read first would move to the first line and the remainder would move to the second line.

Word wrapping in the printer 12 will also work so that text can be displayed in any horizontal or vertical direction. Field block commands (e.g., ^FB, ^TB) may interact with the ^FP command to accomplish text formatting in any horizontal or vertical direction. The ^FP command will have the format ^FPd,g,s and have three parameters: d, g, and s. The "d" will be the primary direction of the text and the "s" will be the secondary direction of text. The secondary direction will be ignored if the command is not interacting with a ^FB command. The middle parameter "g" will remain as the parameter for additional inter-character gap. Table 1 shows the different command possibilities for ^FP. The default for parameter "d" will be H (Horizontal) and the default for parameter "s" will be V (Vertical). The default for parameter "s" will change to R (Reverse) when either V or B (Bottom Up) is used for the parameter "d".

TABLE I

Word Wrapping Interactions

| | Command | Output | Primary Direction | Secondary Direction |
|---|---|---|---|---|
| 1 | ^FPH,g,V |  | Left to Right | Top to Bottom |
| 2 | ^FPH,g,B |  | Left to Right | Bottom to Top |
| 3 | ^FPV,g,H |  | Top to Bottom | Left to Right |
| 4 | ^FPB,g,H |  | Bottom to Top | Left to Right |
| 5 | ^FPR,g,V |  | Right to Left | Top to Bottom |
| 6 | ^FPR,g,B |  | Right to Left | Bottom to Top |
| 7 | ^FPV,g,R |  | Top to Bottom | Right to Left |
| 8 | ^FPB,g,R |  | Bottom to Top | Right to Left |

Additionally, the printer 12 is capable of supporting multiple scripts on a single label that are oriented both vertically (e.g., Japanese) and horizontally (e.g., English). In this regard, a new command to ZPL, the text block command ^TB, has been added. Currently this command supports complex horizontal text layout but is capable of being expanded to also support complex vertical text. In order to allow for this expansion an expandable command set within Zebra's current printer control command set was specified. This specification consists of an escape sequence that can be included within the printer data command (^FD) for the text block to add typographical commands. Each escape sequence starts with '<' and ends with '>'. For example, the "<<>" command allows the printer 12 to print a less than character in a text block. At a later date, additional commands may be added, such as <RL> to define Right to Left line stacking progression in vertical text and <rotate> to define a rotation of the glyphs in the line progression. Furthermore, the use of an expandable set of escape sequences may facilitate compliance with the proposed CSS3 (cascading style sheets) standard for layout of complex vertical text. Additional examples of how such a command sequence could be used can be found in Unicode Technical Note #22.

Figure 8:
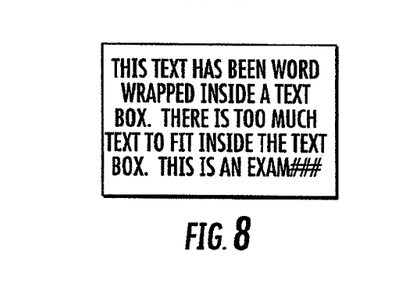
FIG. 8 is an exemplary text box illustrating that the size of the text box is inadequate to accommodate all of the text therein according to another embodiment of the present invention.

Another issue with the current word wrap command is that it overwrites the last line of text if there are not enough lines in the text box for all of the text to fit. The printer 12 requires that the word wrap command truncate and disregard the remaining text instead of overwriting the last line if there is not enough space. However, the user will have the option to know if the text box is truncating part of the text because the last three characters that are displayed on the last line of the text box will be replaced with a # sign to identify there is text that cannot fit inside the text box, as shown in FIG. 8. The option to validate the truncating of the text will have the default of no validation to remain backwards compatible.

The notification of text being truncated is a useful feature when using variable data fields. Since the label is formatted without knowing the size of the data field, the user should know if there is data missing from the text box. Regardless of the validation option, the word wrap is configured to not overwrite the last line of text if there are not enough lines for all of the text to fit in the text box.

The printer 12 is capable of supporting text rotation without losing any of the capabilities of the current solution Moreover, the printer 12 is capable of supporting large printer resident fonts that support sufficient scripts required for multinational companies that may want to print multiple language content labels. Fonts of this size typically exceed 20 megabytes.

The printer 12 typically provides support for UTF-8 and UTF-16 (big endian and little endian), along with UCS-2. UCS-2 is similar to the Unicode encodings, but is actually defined by ISO 10646. UTF-8 has an optional byte order mark ("B.O.M."). The rest of the encodings may or may not have a B.O.M. present to identify big endian or little endian. If there is no B.O.M., the default is big endian. UTF-16 includes a mechanism known as "surrogates," where two separate 16-bit code units stand in for a single character beyond the Basic Multilingual Plane (BMP). Surrogates themselves are not characters; it takes two (one "high" and one "low") to properly represent a character. The printer 12 is also capable of supporting UTF-32 and UCS-4; however, these encoding schemes require a full 32 bits for every character, requiring more space than a UTF-16 or UTF-8 encoded file, unless all of the characters are outside of the BMP. The printer 12 includes a ^CI command that supports the switching between UTF-8, UTF-16BE and UTF-LE encoding. Furthermore, the printer 12 can interpret a Unicode BOM to induce the switching between UTF-8, UTF-16BE, and UTF-LE encoding.

With the vast number of code points in the Unicode Standard, it is possible that a character without a glyph in the selected font or an unassigned code point may be selected. In the case that there is no glyph for the requested code point or character, an identifier, such as a symbol (e.g., "□") could be displayed in place of the glyph. It is desirable to have the option that a "last resort" font be used to identify if the requested code point without a glyph is an illegal code point, unassigned code point, or informs the user to which character block the code point belongs.

The printer 12 not only supports Unicode, but also ASCII and other legacy encoding schemes. Table 2 provides examples of common legacy encoding schemes used around the world.

TABLE 2

Legacy Encoding Schemes

| Region/Language | Encoding Schemes |
| --- | --- |
| United States | ASCII |
| Latin | CP 850 |
| Japan | JIS (ISO 2022-JP), Shift-JIS |
| Korea | UHangul, Johab, Wansung |
| China/Taiwan | Big 5, GB 2312, HZ |

While mode changes of encoding schemes are required within a ZPL script, there can be no requirement to identify the encoding scheme used for individual text elements. This concept of encoding scheme mode changes can be compared to the current handling of character set changes in a ZPL script. If the entire label is going to be in one international character set, the ^CI command sets the default character set for the entire ZPL script. However, if multiple character sets or encodings are being used in the script, several ^CI commands will switch between the characters sets or encodings. After each ^CI command the character set and encoding remain the same until a trigger, such as another CI command or a Unicode BOM, is given to switch character sets. Thus, the CI command can change both the character set and encoding scheme simultaneously Providing support for legacy and Unicode encoding schemes allows the customer to continue to send existing printer control scripts to the printer 12 that are saved in an ASCII-transparent encoding scheme without changing the script at the same time as new Unicode scripts are sent to the printer 12. The printer 12 is capable of parsing printer control commands that are being sent simultaneously in both ASCII transparent encoding schemes and in UTF-16 encoding schemes without requiring an encoding indicator before the printer control commands are sent to the printer by maintaining two different parsing states defined by three pieces of state information. The two parsing states indicate if ASCII transparent data or if non-ASCII transparent data (i.e. UTF-16) are being parsed. The three pieces of state information include the current parsing state, the last endianness for a UTF-16 data stream, and the last ASCII transparent encoding scheme, which is called ASCII Trans Type. The printer 12 will be initialized in the ASCII transparent encoding state, the endianness for UTF-16 data streams is set to big endian, and the ASCII transparent type is set to the default encoding scheme.

Figure 11A:
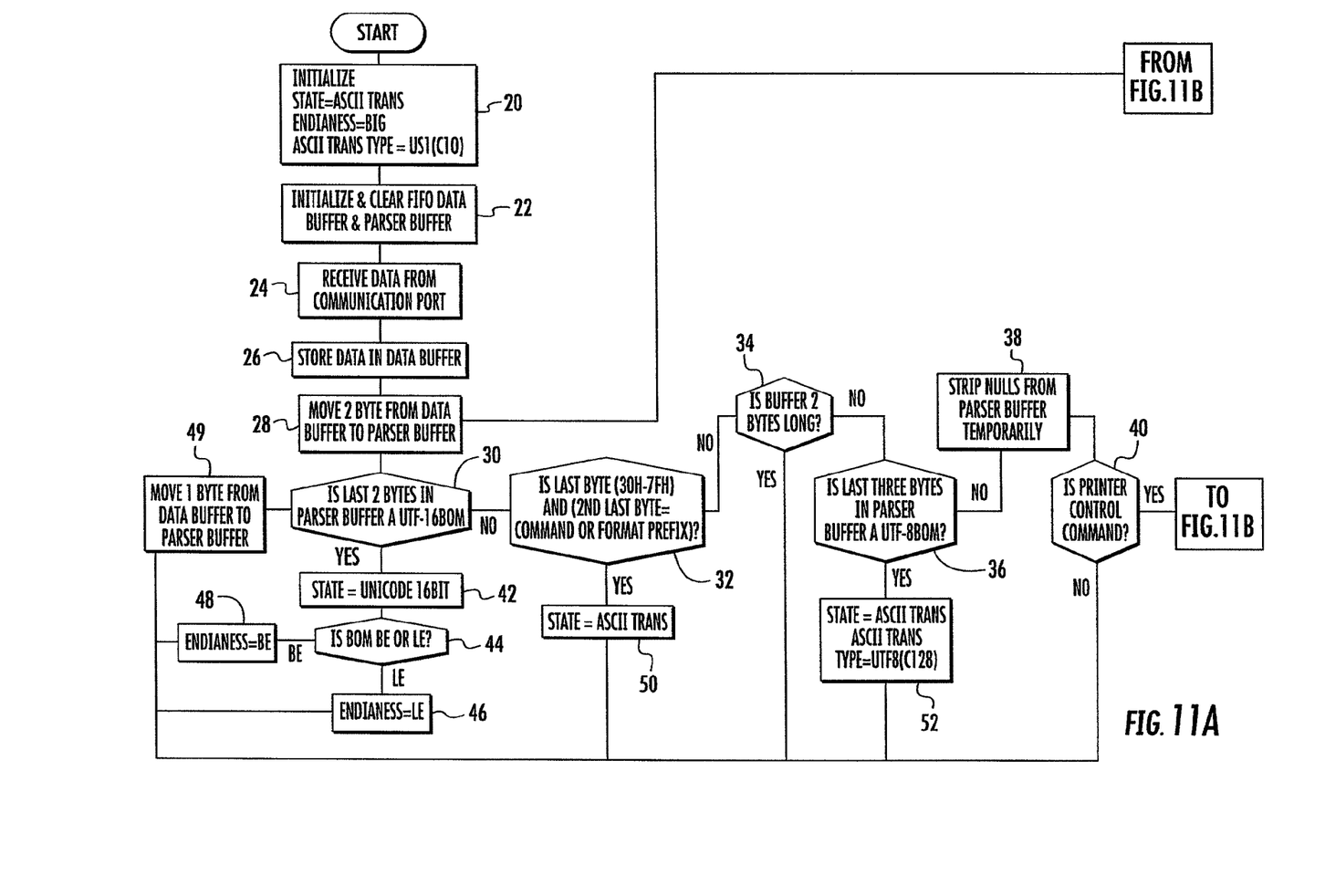
FIGS. 11A and 11B are flowcharts illustrating a process for encoding scheme interleaving according to one embodiment of the present invention.
Figure 11B:
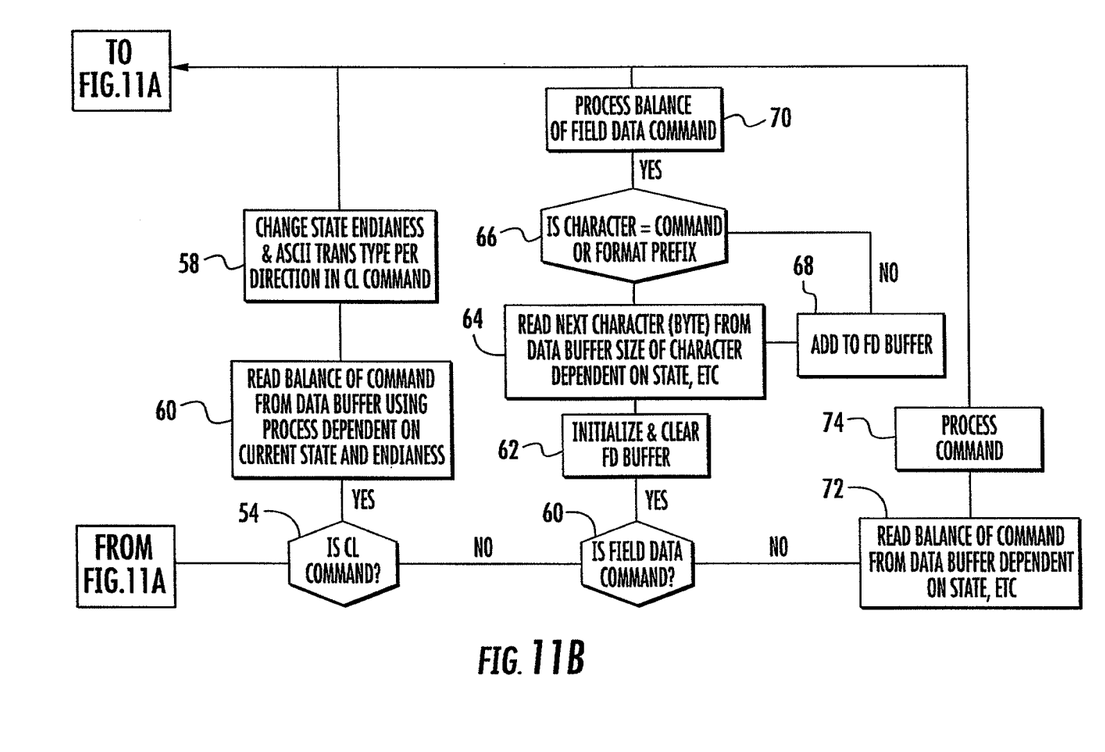

As shown in FIG. 11A and FIG. 11B the parser takes in data, initializing and setting data structures needed to process incoming data (blocks 20-26). In blocks 28 and 30 the printer 12 identifies the data being sent to the printer by analyzing the bytes received, with the goal of determining if the last two bytes in the parser buffer are UTF-16 BOM. If a 16 bit BOM is identified, the printer 12 adjusts the parser state and endianness variables accordingly (blocks 42-48). If the printer 12 identifies a printer control command prefix followed immediately by a ASCII character in the range 0x30 to 0x7f, the parser state is set to ASCII transparent (blocks 32 and 50). If the buffer is not 2 bytes long (block 34) and the printer 12 identifies a UTF-8 BOM, the parser state is set to ASCII transparent and the ASCII transparency type is set to UTF-8 (blocks 36 and 52). The printer eliminates all bytes that are null (0x00) from the parser buffer in order to identify printer control commands that are ASCII based (block 38 to 40). If the command identified is the ZPL command ˆCI, the printer reads the balance of the command from the data buffer using a process dependent on the current parser state (ASCII transparency or Unicode 16 bit) and endianness. The printer then changes the parser state and ASCII transparency type and endianness per the direction indicated by the ˆCI command (blocks 54-58).

If the command identified is a ZPL command that is a data carrier command, such as but not limited to ˆFD, ˆFV, ˆSN, ˆSF, the printer reads the next character from the data buffer. The size of the character read is dependent upon three pieces of information, the parser state, ASCII transparency type, and endianness. If the parser state is Unicode 16 bit, a character will be composed of 2 bytes. If the parser state is ASCII transparency and the ASCII transparency type is single byte encoding, a character is composed of 1 byte. If the parser state is ASCII transparency, and the ASCII transparency type is a multi-byte encoding, the size of the character is determined by the value of the first byte of the character as indicated by the encoding type used (blocks 60-64). When the character found is equal to the printer control command prefix, the printer terminates the data carrier command processing task (blocks 66-70).

In addition to the standard encoding schemes, the printer 12 is also capable of supporting other characters sets, such as, for example, Zebra OEM character sets in the ˆCI ZPL II command as in ZPL II Programming Guide Volume One Rev. A and the various code pages utilized by the fonts in the current price lists. Furthermore, the printer 12 is capable of supporting ASCII command interactions, such as ASCII control characters assigned as shortcuts for ZPL commands that may conflict with Unicode characters. For example, ETX (0x03) is a shortcut for the ˆXZ command. However, the byte 0x03 is also the first byte for the code point "combining dot below" when encoded in a UTF-16 big endian encoding scheme. The printer 12 is capable of distinguishing the byte 0x03 as either an ETX and therefore, a shortcut for an ˆXZ command or as the first byte of a combining dot below character, dependent on the current encoding state.

The printer 12 may also provide real-time clock support independent of the encoding scheme utilized. For example, the ˆFC command can remain only supporting ASCII characters as values for parameters, but the ASCII characters must function in any encoding scheme and mix in the data field with other non-ASCII characters.

Furthermore, the printer 12 provides support for other character sets and encoding schemes in addition to Unicode, such as character sets and encoding schemes listed in Table 2. The printer 12 is also capable of supporting GB 18030-2000, which is a standard required by the People's Republic of China. The Chinese government issued a regulation in the year 2000 stating that operating systems for non-handheld computers must comply with the standard. Although printers are exempt from this regulation, any user driving label printing from a GB 18030 compliant device, such as a Chinese version of Windows, will require printer resident GB 18030 support. GB 18030 is a coded character set that encodes the characters as one, two or four bytes. It is a superset of GB2312 and GBK and incorporates all of Unicode's CJK Unified Ideographs Extension A. When providing support for GB 18030-2000, the printer 12 will also require a printer resident font that supports the GB 18030 characters set.

Moreover, the printer 12 may also be configured to support Big5-HKSCS. The Hong Kong Supplementary Character Set is an extension of the Big5 character set and encoding and adds 4702 characters to the character set. The missing characters were Cantonese, scientific names, personal names, pinyin symbols, and other foreign characters, such as hiragana, katakana, and Russian. All code points of the Supplementary Character Set can be found within existing code space of Big5. These are commonly used characters in Hong Kong that were not supported in the original character set.

The printer 12 is further capable of supporting different fonts for different locales. In the effort to assign characters to code points in Unicode, Han unification occurred. Unicode unified some similar Japanese, Korean, Simplified Chinese, and Traditional Chinese characters into a single code point even when they have a slightly different glyph. So, some characters can have up to four different glyphs depending if the character is in Simplified Chinese, Traditional Chinese, Japanese, or Korean text. Since Unicode defines the character and not the glyph, the appropriate font must be used to achieve desired glyph. If an inappropriate font is used, the characters are readable and recognizable, but not correct. Thus, different glyphs may be represented for the same character and have the same code point, but a correct font must be used to properly display each glyph.

Figure 4:
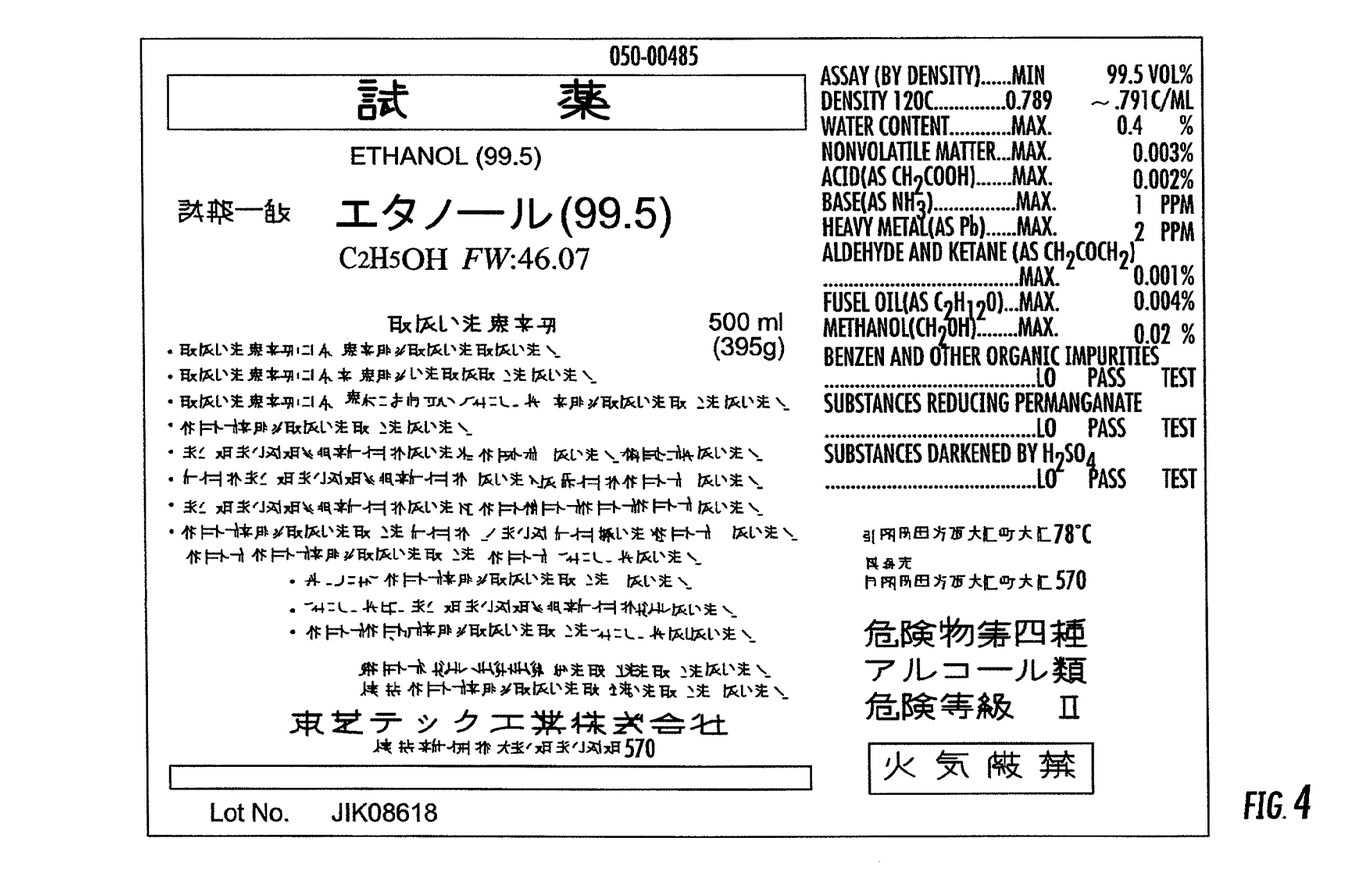
FIG. 4 is an exemplary label depicting multiple fonts according to one embodiment of the present invention.

Furthermore, the printer 12 is capable of supporting multiple fonts in a single ZPL script. Customization of the glyph appearance is necessary for several reasons, such as Han Unification. Han Unification requires a locale specific font to display the appropriate characters. Multiple fonts may also be required when the user wants to display text in different styles. The example in FIG. 4 illustrates a label that was printed with several fonts. Since the Japanese characters on the label were not available in the font that was used to print the English characters, two fonts were required.

Users are capable of creating custom characters that are assigned a code point in the Unicode private character space, such as using the Private Character Editor in Microsoft Windows. The Private Character Editor creates a smooth, scalable font that is given the extension .TTE and functions like a True Type Font. The Private Character Editor is used to create glyphs for uncommon characters or symbols that are not available in an existing font, for example, an Asian character found in a proper name or a company logo. The printer 12 may support the TTE fonts as downloadable printer resident fonts, in same manner that True Type fonts are supported. The printer 12 may also support linking of private character font to associated font, such that if the base font does not have a glyph for the required character, the printer looks to the linked private character font for the glyph. With the introduction of the TTE fonts and improved support for other fonts, the printer 12 also simplifies the process of loading TTF and TTE to the printer.

According to another embodiment of the present invention, the printer 12 is capable of supporting barcodes that are encoding scheme independent. For example, the printer 12 is capable of encoding various types of barcodes, such as one-dimensional, Maxicode, Aztec, Datamatrix, PDF417, MicroPDF417, RSS, TLC-39, and 16K barcodes. However, not all barcodes are encoding scheme independent, such as the QR barcode. The QR barcode is capable of encoding Kanji characters, which must be encoded as Shift-JIS as defined by the QR code specification.

Figure 12:
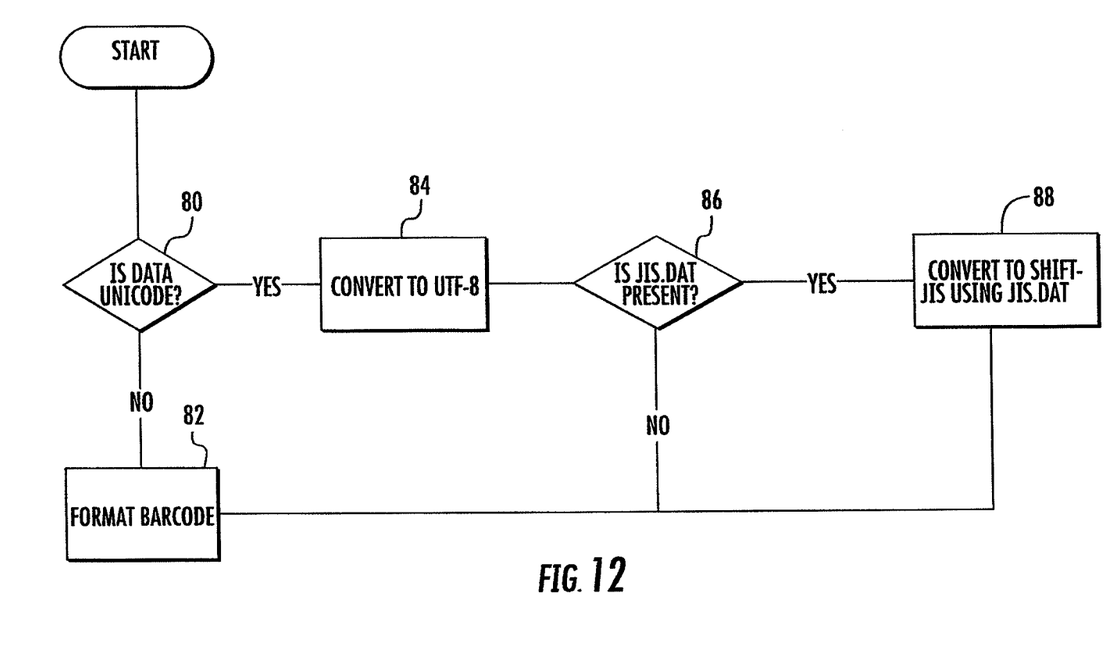
FIG. 12 is a flowchart depicting a process for encoding barcodes according to another embodiment of the present invention.

The printer 12 is capable of intelligently converting Unicode encoded input data into Shift-JIS data in order to support QR barcodes. As described above, a QR barcode formatter requires Kanji data to be encoded via Shift-JIS. Data stream input encodings that are of particular relevance for the QR barcode are ^CI15 (Shift-JIS) and ^CI28-30 (Unicode). As shown in FIG. 12, the QR barcode is expecting Shift-JIS data and, if the user has selected ^CI15 (i.e. non Unicode) (block 80), the printer 12 may send the input data directly into the barcode without changing anything (block 82). For ^CI28-30, the data will be converted from Unicode to the proper data for the specified character mode. In this regard, the first step is to convert the data to UTF-8 (block 84), which ensures that numeric and alphanumeric data will be processed correctly in the absence of the Shift-JIS data table (JIS.DAT). If a Shift-JIS data table is not present (block 86), the UTF-8 converted data stream is sent to the QR code formatter (block 82) for rendering. However, if a Shift-JIS data table is available, the entire UTF-8 data stream is converted (block 88). That is, for numeric mode and alphanumeric mode data, the stream will be filtered for those characters and sent to the formatter as single byte data. 8-bit Byte mode is JIS X 0201, which can be found in Table 6 of the QR standard. Unicode data should be converted to this single byte encoding before formatting the barcode. Finally, Kanji mode is JIS X 0208, where the Unicode data will be converted back to Shift-JIS using the Shift-JIS data table in reverse before formatting the barcode.

The printer 12 is also capable of supporting serialization according to another embodiment of the present invention. The ^SN ZPL command, which represents Serialization Data, will only increment numbers and will interpret the data field in an encoding scheme independent fashion. The command will start with the last integer in the field data stream and have a maximum string length of 12 digits. Table 3 illustrates an example of two encodings of ^SN 9/10. Both encodings should have the output of 9/10, 9/11, 9/12, etc.

TABLE 3

| ^SN 9/10 | | | |
|---|---|---|---|
| | 9 | / | 1 | 0 |
| UTF-8 | 39 | 2F | 31 | 30 |
| UTF-16 | 0039 | 002F | 0031 | 0030 |

Table 4 shows an example of a ASN command that has non-ASCII characters in the field. This command is ^SN 9 月 10 日 and will work similar to the previous example. The output for all encodings should be 9 月 10 日, 9 月 11 日, 9 月 12 日, etc.

TABLE 4

| ^SN 9月10日 | | | | |
|---|---|---|---|---|
| | 9 | 月 | 1 | 0 | 日 |
| UTF-8 | 39 | E6 9C 88 | 31 | 30 | E6 97 A5 |
| UTF-16 | 0039 | 6708 | 0031 | 0030 | 65E5 |

Figure 13:
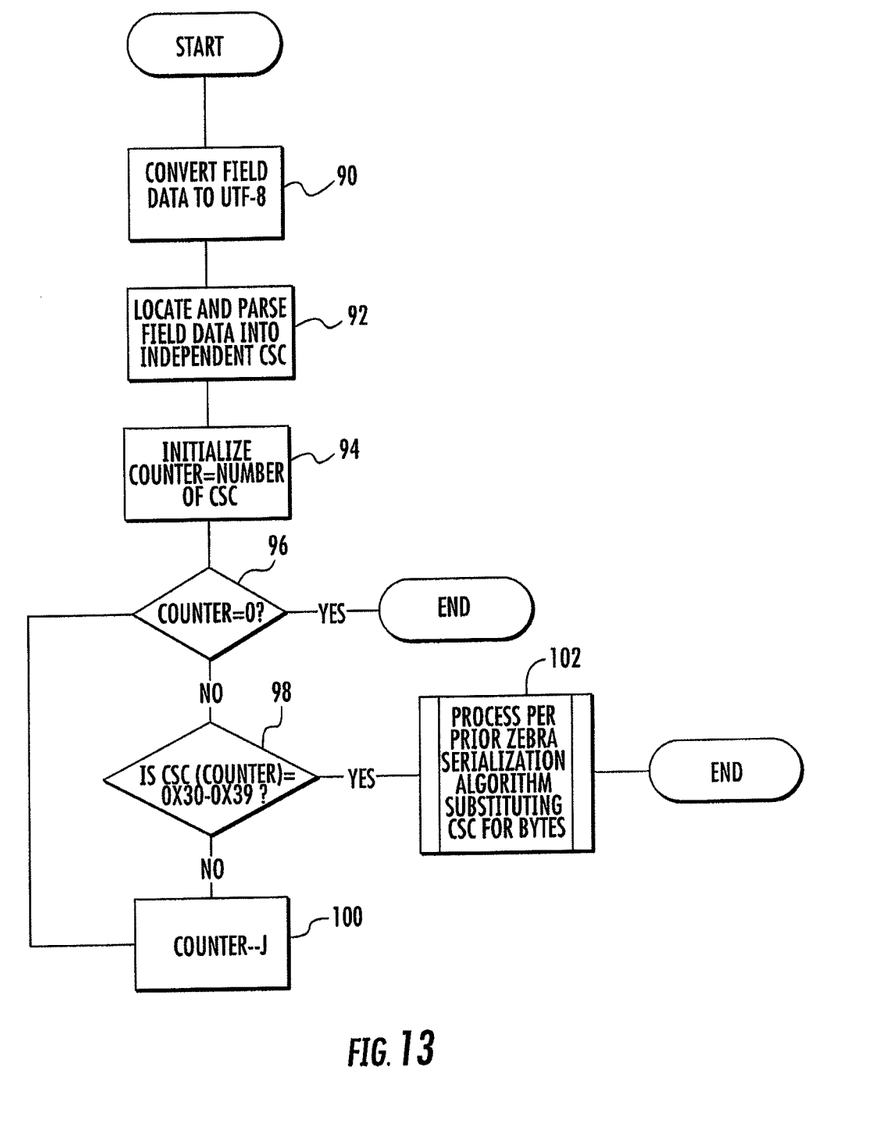
FIG. 13 is a flowchart depicting a process for serializing data based on combining semantic clusters according to one embodiment of the present invention.

An exemplary technique for implementing serialization of encoding scheme independent data is outlined in FIG. 13 and Tables 5 and 6.

TABLE 5

Combining Semantic Cluster Boundary Properties

| | |
|---|---|
| CR | U+000D Carriage Return (CR) |
| LF | U+000A Line Feed (LF) |
| Control | General_Category = (Line Separator (Zl) \| Paragraph Separator (Zp) \| Control (Cc) \| Format (Cf) ) && NOT (U+000D \| U+000A \| U+200C \| U+200D) |
| Extend | General Category = Nonspacing_Mark (Mn) \| Enclosing_Mark (Me) \| Spacing_Mark (Mc) \| U+200C \| U+200D |
| Link | Grapheme_ Link = TRUE |
| L | Hangul_Syllable_Type = L |
| V | Hangul_Syllable_Type = V |
| T | Hangul_Syllable_Type = T |
| LV | Hangul_Syllable_Type = LV |
| LVT | Hangul_Syllable_Type = LVT |
| Any | Any character (includes all of the above) |

TABLE 6

Combining Semantic Cluster Boundary Rules

| Break at the start and the end of text. | | | |
|---|---|---|---|
| SOT | ÷ | Any | (1) |
| Any | ÷ | EOT | (2) |
| CR | X | LF | (3) |
| (Control\|CR\|LF) | ÷ | Any | (4) |
| Any | ÷ | (Control\|CR\|LF) | (5) |
| Do not break Hangul Syllable sequences | | | |
| L | X | (L\|V\|LV\|LVT) | (6) |
| (LV\|V) | X | (V\|T) | (7) |
| (LVT\|T) | X | T | (8) |
| Do not break before extending characters | | | |
| Any | X | Extend | (9) |
| Do not break after Link Characters | | | |
| Link | X | Any | (10) |
| Otherwise, break everywhere. | | | |
| Any | ÷ | Any | (11) |

[X = No Boundary (do not allow break here); ÷ = Boundary (allow break here)]

The first step is to convert the field data to UTF-8 (block 90). Next, the data stream is parsed into an array of independent combining semantic clusters (CSC) per the rules outlined in Tables 5 and 6 (block 92). A loop is initialized to examine the CSC array starting at the end of the array (blocks 94-100) in order to find an element in the CSC array that is composed of a single byte with a value of 0x30-0x39 inclusive (block 98). At this juncture, the balance of serialization can be completed using previous algorithms developed by Zebra Technologies for serialization with the simple substitution of the concept of the combining semantic cluster instead of a single byte (block 102).

Figure 10:
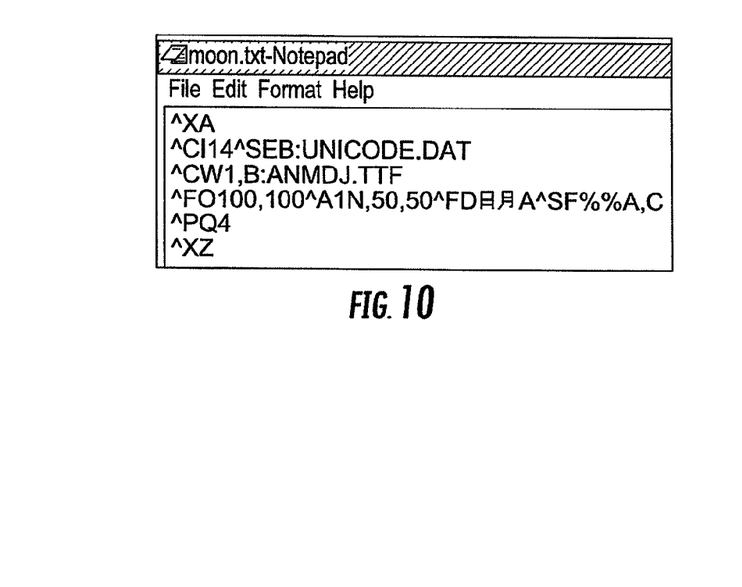
FIG. 10 is an exemplary command having non-ASCII characters in the data field according to one embodiment of the present invention.

The ^SF command is encoding scheme independent. Alphanumeric is defined as 0x30-0x39, 0x41-0x5A, and 0x61-0x7A. If there is any mismatched mask members, that mask member changes to %. The example in FIG. 9 has all ASCII characters in the data field. The output should be 12A, 12C, 12E, and 12G for all encodings of the ZPL script. The example in FIG. 10 has non-ASCII characters in the data field. These characters will be ignored using the % mask. The output for all encodings should be 日 月 A, 日 月 C, 日 月 E, and 日 月 G.

Figure 14:
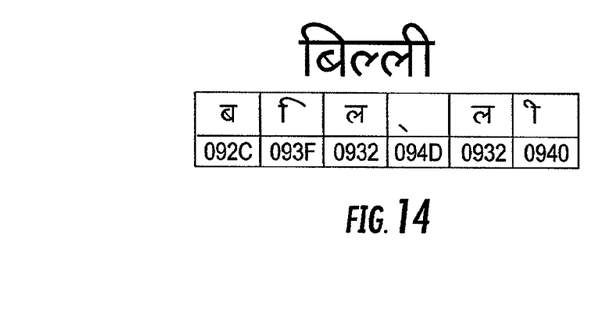
FIG. 14 is an exemplary sequence of code points and its associated printed representation illustrating one potential application of a combining semantic cluster according to another embodiment of the present invention.

The Unicode Standard defines the concept of grapheme clusters for identifying units of characters represented by multiple Unicode code points (e.g., non-spacing combining marks). When working with "characters" that are to be reversed or split vertically, certain clusters should not be broken such that a glyph that should not be by itself does not end up by itself. The example in FIG. 14 has several combining semantic clusters. The first combining semantic cluster is the combination of the first two code points in the sequence. Code point 093F is a spacing mark that combines with code point 092C. The code point 093F-Devangari Vowel Sign I—is a dependent spacing vowel mark and is never found in isolation of the base character, whose vowel sound it modifies. Thus, the printer 12 may employ the concept of a Combining Semantic Cluster, which is a group of code points between Combining Semantic Cluster Boundaries. Tables 5 and 6 set out the Combining Semantic Cluster Boundary Properties and Rules, respectively.

Once the definition of a Combining Semantic Cluster is complete, the functionality can be redefined and algorithms provided for the revised ^FP and ^SF commands. The ^FP command allows vertical and reverse "character" printing. This will be handled in the vertical case by splitting the text at the Cluster Boundaries. It is equivalent to inserting a CR (carriage return) and LF (line feed) between all Combining Semantic Clusters. This will also work for right-to-left text and bidirectional text, as right-to-left text is ignored when printing top-to-bottom (see Unicode Technical Note #22 for details). In the reversal case, again the text is split at Cluster Boundaries and all the clusters are simply reordered. In addition, in order to prevent unwanted ligatures that may change the meaning, a Zero Width Non-Joiner (U+200C) should be inserted between each cluster.

Regarding an encoding scheme independent implementation of the ^SF command, the term character is replaced with Combining Semantic Cluster. Thus, a single % could mask an entire Combining Semantic Cluster, rather than a single code point. Moreover, the mask string and the target string are aligned at the first code-points in their respective backing stores, while the mask string and increment string are aligned at the last code-points in their respective backing stores. All masks should be developed with regard to the backing store rather than to visual order. Finally, code points involving Bi-directional Overriding (RLM, LRM, RLE, LRE, RLO, LRO, and POP) should be automatically skipped and do not require mask placeholders.

With respect to the ^SN command and similar to the ^SF command, the antiquated concept of "right most" is replaced with the first number working backwards in the backing store to properly account for bidirectional text.

The present invention has many advantages. For example, the printer reduces the amount of data required to be sent between the printer and the host, as the host can now transmit only the code points rather than the bitmap image, which also reduces the first label out time. The printer also enables more cost effective and proper support of the languages required in new and emerging markets, such as China or UAE. Many of the new and growing markets are not supported with a complete or proper thermal printing solution for their languages. For example, there does not appear to be a thermal printer that can support all of the Simplified Chinese characters required for printing a label in Chinese in an efficient and cost effective manner. Furthermore, the printer is capable of interpreting serialized scripts written in both Unicode and non-Unicode commands such that the printer is capable of supporting legacy encoding schemes.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method comprising:
   receiving data from at least one host computer at a printer, wherein at least a portion of the data is encoded in a first encoding scheme;
   converting the data into converted data in a second encoding scheme;
   parsing the converted data into an array of elements based on a plurality of rules; and
   generating, using a processor, a plurality of labels for printing based on the array of elements, wherein each of the plurality of labels are printed such that one or more elements within the array are at least one of incremented or decremented.

2. The method of claim 1, wherein converting comprises converting the data encoded in a Unicode encoding scheme into a UTF-8 encoding scheme.

3. The method of claim 1, wherein parsing the converted data into the array of elements comprises parsing the data into an array of combining semantic clusters based on a plurality of boundary properties and boundary rules.

4. The method of claim 1, wherein parsing the converted data into the array of elements comprises parsing the converted data into an array of combining semantic clusters each comprising non-spacing combining code points.

5. The method of claim 1, further comprising:
   determining whether one or more elements within the array of elements are integers; and
   causing the one or more elements to be incremented or decremented in an instance in which they are integers.

6. The method of claim 1, further comprising:
   determining whether one or more elements within the array of elements are ASCII characters; and
   causing the one or more elements to be incremented or decremented in an instance in which they are ASCII characters.

7. The method of claim 1, further comprising:
   determining whether one or more elements within the array of elements are ASCII characters; and
   causing the one or more elements to be masked in an instance in which they are non-ASCII characters, wherein the one or more masked elements are not incremented or decremented.

8. The method of claim 1, wherein the data is serialization data and at least one element is a combining semantic cluster.

9. The method of claim 8, wherein the combining semantic cluster comprises a plurality of code points.

10. The method of claim 8, wherein the serialization data further comprises one or more printer commands in a printer language having one or more of the commands ^SF, ^FD, ^SL, and ^SN.

11. The method of claim 1, wherein each of the plurality of labels for printing comprises a barcode comprising one or more elements within the array.

12. A printer for printing a label that is encoding scheme independent, the printer comprising:
   a receiving component configured to receive data from at least one host computer at the printer, wherein at least a portion of the data is encoded in at least a first encoding scheme; and a parsing component configured to:
  convert the data into converted data in a second encoding scheme; and
  parse the converted data into an array of elements based on a plurality of rules; and
a rendering component configured to:
  render a plurality of labels for printing based on the array of elements, wherein each of the plurality of labels are printed such that one or more elements within the array are at least one of incremented or decremented.

13. The printer of claim 12, wherein converting comprises converting the data encoded in a Unicode encoding scheme into a UTF-8 encoding scheme.

14. The printer of claim 12, wherein parsing the converted data into the array of elements comprises parsing the data into an array of combining semantic clusters based on a plurality of boundary properties and boundary rules.

15. The printer of claim 12, wherein parsing the converted data into the array of elements comprises parsing the converted data into an array of combining semantic clusters each comprising non-spacing combining code points.

16. The printer of claim 12, wherein the rendering component is further configured to:
  determine whether one or more elements within the array of elements are integers; and
  cause the one or more elements to be incremented or decremented in an instance in which they are integers.

17. The printer of claim 12, wherein the rendering component is further configured to:
  determine whether one or more elements within the array of elements are ASCII characters; and
  cause the one or more elements to be incremented or decremented in an instance in which they are ASCII characters.

18. The printer of claim 12, wherein the rendering component is further configured to:
  determine whether one or more elements within the array of elements are ASCII characters; and
  cause the one or more elements to be masked in an instance in which they are non-ASCII characters, wherein the one or more masked elements are not incremented or decremented.

19. The printer of claim 12, wherein each of the plurality of labels for printing comprises a barcode comprising one or more elements within the array.

20. The printer of claim 12, wherein the data further comprises one or more printer commands in a printer language having one or more of the commands ^SF, ^FD, ^SL, and ^SN.

21. A computer program product, the computer program product comprising a non-transitory computer-readable storage medium storing computer program code that, when executed by an apparatus, causes the apparatus to:
  receive data from at least one host computer at a printer, wherein at least a portion of the data is encoded in at least a first encoding scheme;
  convert the data into converted data in a second encoding scheme;
  parse the converted data into an array of elements based on a plurality of rules; and
  generate a plurality of labels for printing based on the array of elements, wherein each of the plurality of labels are printed such that one or more elements within the array are at least one of incremented or decremented.

22. The computer program product of claim 21, wherein converting comprises converting the data encoded in a Unicode encoding scheme into a UTF-8 encoding scheme.

23. The computer program product of claim 21, wherein parsing the converted data into the array of elements comprises parsing the data into an array of combining semantic clusters based on a plurality of boundary properties and boundary rules.

24. The computer program product of claim 21, wherein parsing the converted data into the array of elements comprises parsing the converted data into an array of combining semantic clusters each comprising non-spacing combining code points.

25. The computer program product of claim 21, wherein the computer program code, when executed by the apparatus, further causes the apparatus to:
  determine whether one or more elements within the array of elements are integers; and
  cause the one or more elements to be incremented or decremented in an instance in which they are integers.

26. The computer program product of claim 21, wherein the computer program code, when executed by the apparatus, further causes the apparatus to:
  determine whether one or more elements within the array of elements are ASCII characters; and
  cause the one or more elements to be incremented or decremented in an instance in which they are ASCII characters.

27. The computer program product of claim 21, wherein the computer program code, when executed by the apparatus, further causes the apparatus to:
  determine whether one or more elements within the array of elements are ASCII characters; and
  cause the one or more elements to be masked in an instance in which they are non-ASCII characters, wherein the one or more masked elements are not incremented or decremented.

28. The computer program product of claim 21, wherein the data further comprises one or more printer commands in a printer language having one or more of the commands ^SF, ^FD, ^SL, and ^SN.

* * * * *